United States Patent Office 3,420,422
Patented Jan. 7, 1969

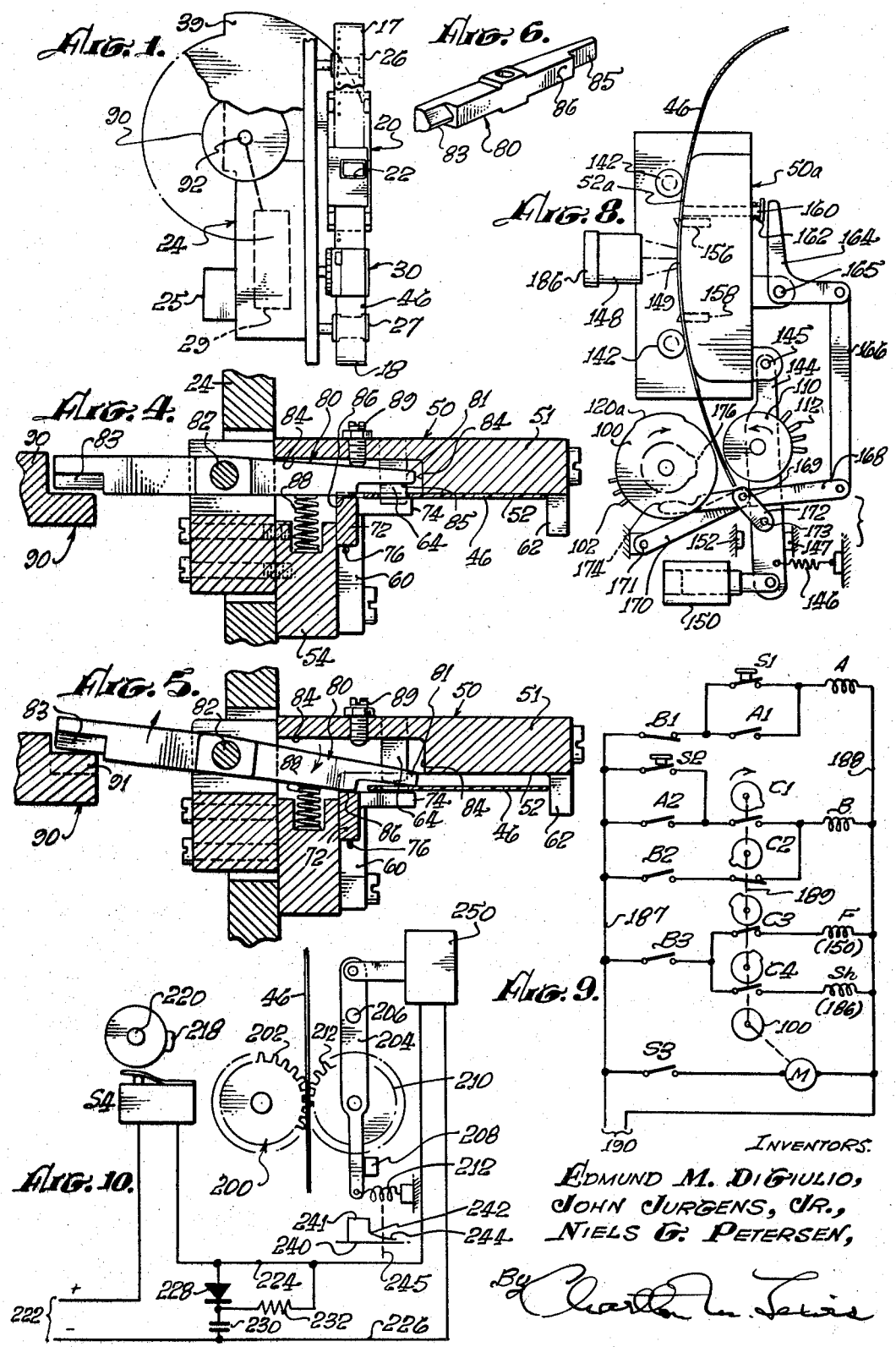

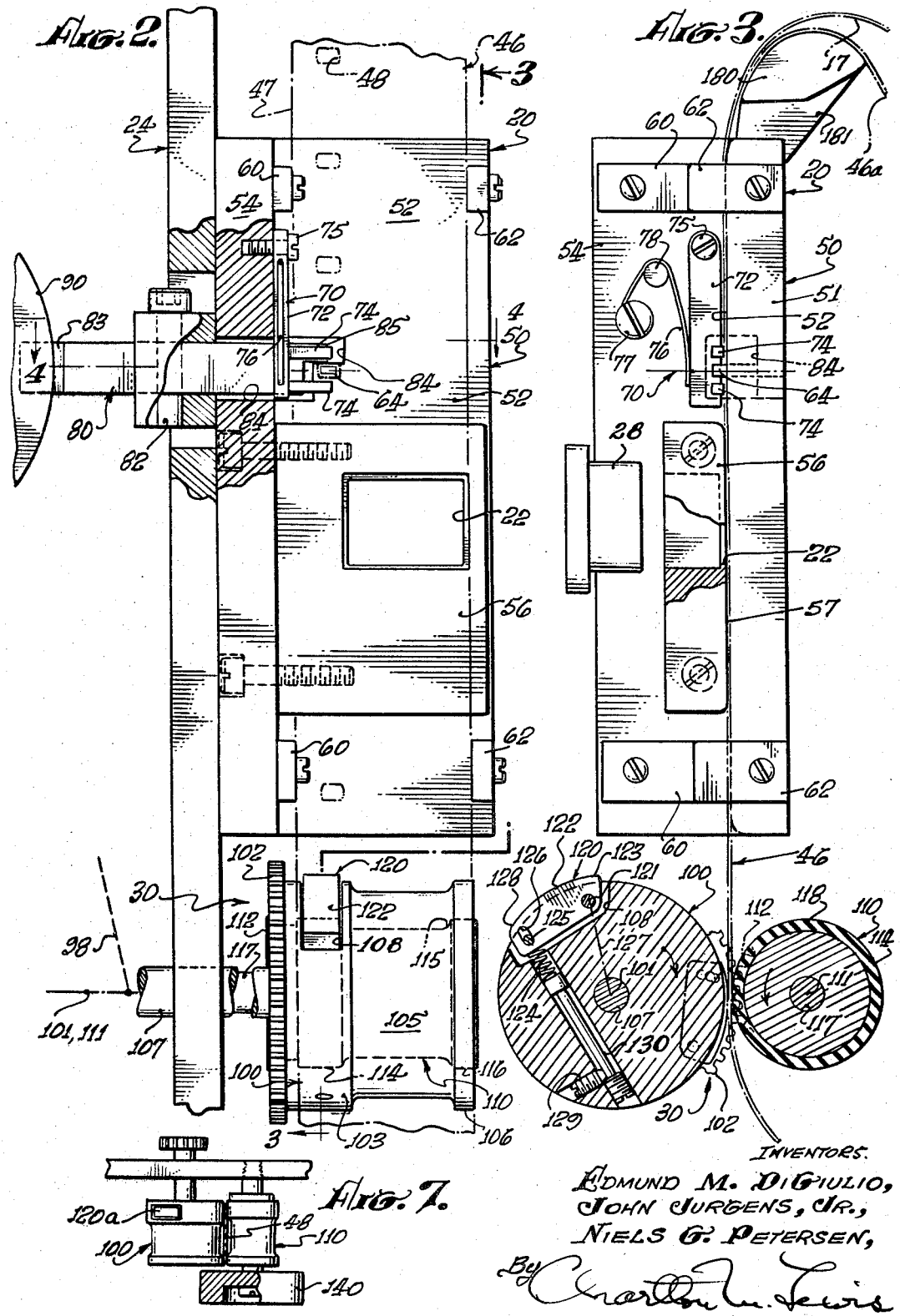

3,420,422
INTERMITTENT FILM MOVEMENT AND REGISTRATION
Edmund M. Di Giulio, Sherman Oaks, John Jurgens, Jr., Northridge, and Niels G. Petersen, Glendale, Calif., assignors to Mitchell Camera Corporation, Glendale, Calif., a corporation of Delaware
Filed Feb. 10, 1967, Ser. No. 615,168
U.S. Cl. 226—55    26 Claims
Int. Cl. G03b 1/28; B65h 17/22; B65h 17/34

ABSTRACT OF THE DISCLOSURE

An intermittent film movement of pinch-roll type obtains improved performance by exerting on the film an accelerating force that varies during each period of movement. Such variable force may be produced by varying the mutual spacing of the pinch rolls by electrical or other means, or by providing a cam-like contact surface on one of the rolls. Such a cam lobe is preferably formed as a separate element mounted on the roller and movable with respect thereto under resilient or positively adjustable control.

Accurate film registration is improved by yieldingly pressing the film toward a fixed registration pin. The presser element is preferably disabled as the film is kicked off the pin at the start of each movement cycle, freeing the film from frictional resistance. Alternatively, two fixed pins are used on opposite sides of the exposure aperture, the film inertia being utilized to stretch it over the pins, on which it is held taut.

---

This invention has to do with film movements for intermittently advancing a perforated film such, for example, as a motion picture film.

The invention is concerned more particularly with film movements capable of advancing a film through a definite uniform distance in a very short time interval.

A further important object of the invention is to combine a very short pulldown time with reliable and positive definition of the film position during the entire dwell time between pulldown movements.

An important example of the utility of movements having the described properties is for motion picture recording of television picture tube displays, as well as for televizing a motion picture film. It is well known that the transfer of information between a television system and a motion picture film record is complicated by the short field retrace time in conventional television. Despite many attempts, no system has previously been available that was capable of advancing a motion picture film within that very short retrace time and then holding it reliably in registered position throughout the time required for field scansion.

In photography of a television screen, the usual line-interlace scanning pattern requires that the film be held stationary with great precision throughout the two field scanning periods that produce a complete frame. Even very slight film movement during or between those fields tends to cause a visible pattern due to imperfect registry of the two interlaced records.

The present invention attains extreme rapidity of advance of the film by imparting the accelerating force to the film through friction rather than by positive engagement of a claw or sprocket in film perforations. Such frictional drive has the great advantage that only the film needs to be accelerated. The intermittent mechanism includes no moving parts that partake of the intermittent longitudinal movement of the film. Although this general form of movement was suggested as long ago as 1897 by Grivolas in British Patent 27,038, it has not come into general use, largely because it has not previously been possible to stop the film in the desired position with adequate precision.

An important aspect of the present invention is the frictional application to the film of an accelerating force by means of frictional coupling that varies in a controlled manner during the pulldown period. A relatively great force is applied to the film initially, accelerating it rapidly, and preferably reaching a definite predetermined terminal speed during a small fraction of the pulldown time. The frictional engagement of the accelerating mechanism with the film is then partially released, reducing the longitudinal force that is exerted on the film. That force may, for example, be lowered to a value just sufficient to overcome the friction of the guideway through which the film moves. It is then possible to stop the film accurately at a desired position, as by interposing a positive stop in position to engage a film perforation, without danger of tearing or otherwise damaging the film. The arresting force need be only large enough to absorb the kinetic energy of the moving film itself. It is unnecessary to arrest the movement of any mechanical elements. Moreover, extreme precision of timing is not required, since the relatively small residual driving force can be maintained up to the very instant of film arrest, or even beyond, without significantly increasing the load on the arresting mechanism.

The accelerating force is typically applied to the film by two continuously rotating rollers journaled on opposite sides of the film and arranged to frictionally grip the film between them during intermittent pulldown periods. The present invention typically employs rollers of modified construction to produce a force having the described time course; or controls the relative movement of the roller axes to exert the desired variable force upon the film.

A further aspect of the invention utilizes particularly effective edge guiding means for positively defining the lateral position of the film during film rest periods, while avoiding unnecessary frictional resistance during the pulldown movement.

Previous film movements having frictional film drive have generally employed film arresting and registration means that engaged only one edge of a film perforation. Such registration can prevent film movement in one direction, but depends upon continuous film tension from the drive mechanism or upon some auxiliary clamping mechanism to prevent film movement in the opposite direction during film exposure. In preferred form of the present invention, the film is arrested and also registered by one or more registration pins that fit both upper and lower perforation edges, defining the film position positively without requiring auxiliary mechanism.

In one form of the invention, such film definition is obtained with a single registration pin that is full-fitting, or even slightly oversize at least with respect to the longitudinal dimension of the perforation. Such a registration pin is preferably mounted fixedly, and full engagement of the film with the pin is assured by pressing the film transversely onto the end of the pin, as by a resiliently urged presser foot. Such a presser foot has the further advantage of accurately defining the lateral film position by effectively clamping it against a face plate surrounding the registration pin. That presser mechanism is preferably disabled prior to, or essentially simultaneously with, the start of the pulldown movement, when the film is positively shifted transversely out of engagement with the pin.

In another form of the invention, two registration pins are used, one above and one below the film aperture, engaging oppositely facing perforation edges of two different perforations, with such spacing that the film is slightly stretched longitudinally over the aperture and anchored effectively positively.

A further aspect of the invention provides a control system which permits the use of a friction drive of the described type for intermittent still camera photography. Such a control system permits continuous drive of the fraction rollers during the time that an exposure may be desired, but maintains the film advancing mechanism in inoperative condition unless an exposure is actually commanded.

A full understanding of the invention and its further objects and advantages will be had from the following description of certain illustrative manners in which it may be carried out. The particulars of that description, as of the accompanying drawings which form a part of it, are intended only as illustration and not as a limitation upon the scope of the invention, which is defined in the appended claims.

In the drawings:

FIG. 1 is a schematic front elevation, partly cut away, representing a film movement in accordance with the invention;

FIG. 2 is a fragmentary front elevation at enlarged scale, corresponding generally to a portion of FIG. 1;

FIG. 3 is a side elevation, partly in section, as indicated by line 3—3 of FIG. 2;

FIG. 4 is a horizontal section on line 4—4 of FIG. 2;

FIG. 5 is a section corresponding to FIG. 4, but showing the mechanism in another stage of the operating cycle;

FIG. 6 is a schematic perspective of an illustrative release lever in accordance with the invention;

FIG. 7 is a schematic horizontal section representing a modification;

FIG. 8 is a schematic side elevation representing a further embodiment of the invention;

FIG. 9 is a schematic wiring diagram, pertaining to FIG. 8; and

FIG. 10 is a schematic drawing representing a further modification.

The illustrative embodiment of the invention shown schematically in FIGS. 1 to 6 comprises the register plate assembly 20 with film aperture 22, fixedly mounted on the camera frame, indicated at 24. That frame also carries the drive motor 25, the associated drive mechanism indicated schematically at 29, the continuously driven supply and takeup sprockets 26 and 27, the lens 28 (FIG. 3), the film driving mechanism 30 and other conventional camera elements, not explicity shown. The usual upper and lower film loops are indicated at 17 and 18 in FIG. 1. The direction of film movement is downward as seen in FIGS. 1 to 3, and will be so described, although the actual mechanism can be oriented in any desired manner in actual use.

The register plate 50 is of L-section (FIGS. 4 and 5) with the mounting flange 54 forming one leg of the L and with the working flange 51 carrying the film guiding surface 52. The aperture plate 56 is fixedly mounted on flange 54 and extends in closely spaced parallel relation to film guide surface 52, with just enough clearance at 57 (FIG. 3) to define the path of the film without appreciably resisting its longitudinal movement. Film aperture 22 is formed in aperture plate 56, admitting light from the camera lens 27 to the front film face, which is the face seen in FIG. 2. If the film movement is to be employed in a projector, a corresponding aperture is provided in register plate 50.

The lateral position of the film may be defined in any desired manner. In the present embodiment, that position is defined approximately by fixed guide blocks, the two inner guide blocks 60 being mounted on flange 54 above and below aperture 22, and the two outer guide blocks 62 being mounted on the plate edge opposite the respective inner blocks. The outer and inner blocks are mutually spaced just sufficiently to clear the film edges and thus to permit free longitudinal movement of the film between them. The lateral film position is defined more precisely during the film rest intervals by the register pin 64, which also defines accurately the longitudinal rest position of the film. Pin 64 is fixedly mounted in register plate 50 in position to project across the normal film path between the upper and lower pairs of guide blocks and to enter a film perforation 48 when the film 46 is in the desired rest position. Pin 64, in accordance with the present invention, preferably fits the film perforations fully, and may even be slightly oversize to insure positive film definition. The pin position is preferably so related to the working faces of the two inner guide blocks 60 that when the film is in registered position engaging the pin the inner film edge 47 firmly engages those guide blocks, positively defining the lateral film position without reference to outer guide blocks 62. That type of film defining structure, in and of itself, is more fully described and claimed in U.S. Patent No. 2,986,316 which issued on May 30, 1961 to Niels G. Petersen, one of the present applicants, and is assigned to the same assignee as the present application. In combination with the present film advancing mechanism, that type of film registration has the special advantage that it provide positive registration without exerting any frictional resistance to the film movement, such as results when spring-pressed edge guides are used, for example.

To insure firm seating of the film over register pin 64, the present invention provides film retainer structure 70, typically comprising the lever 72 pivotally mounted on the fixed pivot pin 75 and carrying the two spaced fingers 74 adapted to engage the front face of the film near its inner edge and on opposite sides of register pin 64. Lever 72 is yieldingly urged toward the film by the spring 76, mounted on plate flange 54 by means of the screw 77 and pin 78 (FIG. 3). That spring is strong enough to insure full and immediate entry of the register pin into a film perforation that is approximately positioned over the pin. Such entry may be facilitated by slight rounding of the pin end, or by actual taper of the pin end portion if desired. Spring pressed lever 72 further serves to define the film position positively in a direction normal to its plane, effectively clamping it against the flat face 52 of the register plate.

To perimit intermittent movement of the film between exposures, mechanism is provided for positively shifting the film transversely out of its normal path to lift it free of register pin 64. As here shown, that mechanism comprises the release lever 80, which is freely pivoted intermediate its length on the pivot pin 82 on an axis parallel to the film inner edge and laterally displaced from it. Lever 80 extends from pivot 82 through a clearance aperture 84 in plate 50, with its working end 81 projecting behind the film edge portion close to register pin 64. Lever 80 is strongly urged by the compression spring 88 in a counterclockwise direction as seen in FIGS. 4 and 5 to a normal position defined by the adjustable positive stop formed by the screw 89. The lever has a contact surface 85 that is normally spaced slightly back of the rear face of the film as shown in FIG. 4. Swinging movement of the lever against the force of spring 88 causes surface 85 to engage the film and positively lift it free of register pin 64, as shown in FIG. 5, the film movement being exaggerated in that figure for clarity of illustration.

In accordance with the present invention, mechanism is also provided to disable retainer 70, perferably by swinging arm 72 positively away from the film and relieving the film of the yielding pressure normally exerted by fingers 74. In the present mechanism, that function is performed directly by release lever 80 through its contact face 86. That face is so positioned as to engage retainer arm 72 and lift fingers 74 free of the film just before lever face 85 engages the film to lift it away from guide surface 52. Thus actuation of the release lever not only relieves the film of the positive restraint of register pin 64 but also eliminates the slight frictional resistance that would be exerted by retainer fingers 74. With lever 80 in its film releasing position of FIG. 5, the film is thus entirely free of any significant restraint against longitudinal movement.

Release lever 80 may be driven in its swinging movement in any desired manner capable of producing suitably timed action. The present embodiment utilizes the face cam 90 typically mounted on the shutter shaft 92 of the camera, which is driven from mechanism 29 and makes one full revolution for each film exposure. Cam 90 is flat over most of its periphery, clearing the cam follower surface 83 on lever 80 as in FIG. 4. The cam has a cam lobe 91 with a steep rise adapted to produce rapid swinging of lever 80 in accurately timed relation to the acutation of the film moving mechanism, to be described. The cam lobe holds lever 80 in film releasing position at least until longitudinal film movement has shifted the film perforation away from pin 64. If the film has more than one perforation per frame, the cam dwell must continue till all unwanted perforations have passed pin 64. The cam then permits lever 80 to be returned by spring 88 to normal position, lowering the film onto the end of pin 64 under the yielding pressure of retainer fingers 74. Hence, when the desired film perforation comes into position over the register pin, the film is being urged transversely with sufficient force to insure that the pin will enter the perforation. The longitudinal film movement is thereby abruptly checked. Retainer 70 then produces full entry of the register pin virtually immediately into the new film perforation, accurately and positively registering the film. Not only does retainer 70 register the film promptly after its movement has been arrested, but it maintains the film in positively defined position throughout the dwell period until the next actuation of release lever 80.

The film driving mechanism 30 of the present embodiment comprises two roller structures 100 and 110, journaled on the parallel axes 101 and 111 spaced on opposite sides of film 46 below register plate 50. The two roller structures may be rotatively coupled directly together, as by the spur gear teeth indicated at 102 and 112, respectively, so that they rotate in opposite directions, as indicated by arrows in FIG. 3, and at such relative speeds that the peripheral speeds of their working surfaces are essentially equal. The rollers are coupled to the camera drive mechanism 29 in such a way that roller 100 completes one revolution for each film exposure in proper phase relation to shutter shaft 92. In the present mechanism roller 100 is fixedly mounted on the shaft 107 which is driven in synchronism with the shutter shaft by gearing indicated schematically at 98; and roller 110 is freely rotatable on the stub shaft 117 and driven from roller 100 by gears 102, 112.

Roller 110 has a cylindrical working surface 114 that extends the full circumference of the roller but is limited axially so that it engages only that portion of film 48 adjacent the film perforations. The rest of the roller periphery is relieved, as at 115, to avoid contacting the frame area of the film. A guide flange 116 may be provided at the opposite end of roller 110, at a radius less than that of working surface 114 but sufficient to position the film approximately. Working surface 114 is preferably of a material having a relatively high coefficient of friction, and may be somewhat yielding in nature. For example, a thin layer of rubber bonded to the metal roller is suitable, as indicated at 118 in FIG. 3.

Roller structure 100 acts in the present embodiment essentially as a carrier for the presser element 120, which is mounted for relative movement in a manner to be described. The main body of roller structure 100 may be of any desired form, but preferably includes cylindrical guide surfaces 103 and 106 at its axial ends having radii adapted to just clear the film at opposite sides of the frame area. The axially intermediate portion of roller 100 is preferably relieved as at 105.

Presser element 120 has an elongated, peripherally extending working face 122 of generally cylindrical form, but rounded smoothly at both ends. Element 120 is mounted in a clearance well 108 in roller 100, and is swingable through a small angle about the pivot pin 121 on an axis parallel to roller axis 101. Element 120 is yieldingly urged about pivot 121 in a clockwise direction as seen in FIG. 2 by the spring 124, the range of pivotal movement being installed by the fixed pin 125 which works in the slot 126 of element 120. In normal position of element 120 at the outer limit of its range of movement, its working surface 122 is approximately coaxial with respect to roller axis 101. Since the length of surface 122 is the primary factor determining the film travel during each pulldown movement, that surface may be referred to as a metering surface, and roller 100 as the metering roller.

Pivot pin 121 is positioned adjacent the leading portion 123 of working surface 122, with that leading portion at such radius from axis 101 that it is closely spaced from the opposing working surface 114 of roller 110 as the rollers revolve. That spacing is selected so that a film 46 between the rollers is firmly gripped between surface 114 and the leading portion of surface 122. Since the leading portion of surface 122 lies close to the axial plane 127 through axis 101 and pivot 121, its radius from axis 101 is essentially independent of the yielding pivotal movement of element 120. Hence the initial gripping force exerted on film 46 is essentially independent of that pivotal movement and can be designed to have a definite selected value, taking account of the resilient action, if any, of surfaces 114 and 122. That initial gripping force is made relatively high, and is typically sufficient to exert on the film a fractional longitudinal force that will accelerate the film to the full peripheral velocity of the roller working surfaces during a small fraction, for example one quarter to one half of the total pulldown period. That initial frictional force may be determined by suitable dimensioning of the parts, or may be made adjustable, if desired, as by mounting roller 110 with its axis 111 adjustable relative to roller 100.

During the final portion of the pulldown movement the film is pressed against working surface 114 of roller 110 by the trailing portion 128 of presser face 122, the point of contact progressively moving away from pivot axis 121 with roller rotation. The force exerted on the film by presser face 122 is then determined less by the dimensions of the structure than by the force of spring 124 and the progressively decreasing mechanical advantage with which that spring compresses the film. In the present structure, spring 124 is conveniently adjustable by means of the screw-threaded plunger 130, which is releasably locked by the setscrew 129.

The force of spring 124 is preferably selected or adjusted to produce on the film a frictional longitudinal driving force that declines progressively to a value just sufficient to overcome the frictional resistance of the film guiding mechanism. That frictional resistance normally includes the resistance resulting from retainer fingers 74, which typically engage the film just prior to the end of the pulldown, as already described. However, even the appreciable resistance of fingers 74 is typically very small compared to the accelerating force exerted on the film during the initial phase of the pulldown. Hence, for many purposes the driving force acting at the end of pulldown may be considered to be substantially zero. On the other hand, by maintaining sufficient driving force to approximately overcome the frictional resistance, the possibility is avoided that the film might stop short of the full desired advance, especially under abnormal conditions such as when the drive motor has not reached normal speed after being started.

Particularly when the working face 114 of roller 110 comprises a relatively resilient layer, it is sometimes satisfactory to omit the spring 124 entirely, and anchor presser element 120 at a fixed angle about pivot pin 121. That angle may be made adjustable, as by direct contact of the screw plunger 130. Alternatively, the working face 122 may be permanently formed as an integral part of roller structure 100, in the manner of a conventional cam, as illustratively shown in FIG. 7 at 120a. The trailing portion of surface 122 is then typically designed to decrease progressively in its radial distance from axis 101 at a rate that gives the desired decrease of friction, taking account of such factors as the compressibility of the opposing working surface of roller 110 and of the film itself. Such integral structures have the advantage of simplicity, and are especially useful when optimum performance and maximum effective life are not required.

Whereas the gripping surfaces on both sides of the film may be of rubber-like material, it is ordinarily preferred to provide a surface with high coefficient of friction on only that one of the rollers that has a continuous peripheral working surface. The cam-like surface of the other roller, which by its limited angular extent controls the length of film pulled down each cycle, is then preferably made of a relatively hard material, such as hardened steel, which will resist abrasion by the film and maintain dimensional accuracy.

The two rollers are driven at equal peripheral rates as already indicated, but their effective diameters are preferably so chosen that their angular speeds are essentially incommensurable. That relation serves to distribute the wear as uniformly as possible over the continuous roller. The diameter of roller 100 is typically relatively large to facilitate production of a film dwell period that is long compared to the pull-down period; and the diameter of roller 110 is preferably relatively small to sharpen the time accuracy of the film gripping and releasing action. If, for example, the gear on roller 100 has 29 teeth and that on roller 110 has 17 teeth, the primary wear due to initial film acceleration is distributed uniformly over 17 positions on the periphery of roller 110.

Even more complete distribution of that roller wear is obtainable by omitting any positive coupling between the two roller drives. Metering roller 100 is preferably driven positively in order to obtain positive phase relation between the pull-down action and the shutter. Backup roller 110 may be driven from roller 100 by means of end flanges that engage yieldingly and produce a continuous frictional coupling between them, somewhat as described in the above identified British Patent 27,038. However, in accordance with the present invention, such interengaging flanges are designed with radii from their respective roller axes that are in the same ratio as the radii of the film engaging surfaces 118 and 123.

FIG. 3 further illustrates use of a fixed snubber post 180, which is fixedly mounted by means of a bracket 181 within the upper film loop 17 formed by continuously driven feed sprocket 26 (FIG. 1). Snubber post 180 is so shaped and positioned that, as the film approaches the end of each film advancing movement, loop 17 is drawn taut over post 180, as indicated at 46a. The snubber post thus aids in arresting the film movement, either by actual contact with the film or by action of the air cushion formed between the film and the curved snubber surface. Such supplementary film arresting mechanism, which is well known in and of itself, may be employed if desired in connection with any of the film movements of the present invention. However, correct adjustment of such a surface is often difficult to obtain and maintain, depending critically upon small variations in the longitudinal film dimension. It is therefore a significant advantage of the present invention, particularly when the resilient action of retainer 70 is provided in combination with the diminishing driving force exerted on the film toward the end of each stroke, that the register pin or pins not only define the film rest position accurately but ordinarily are fully effective for arresting the film movement satisfactorily without requiring any supplementary mechanism.

FIG. 7 represents a modification in accordance with a further aspect of the present invention in which the roller gears 102 and 112 of FIGS. 2 and 3 are omitted, and backup roller 110 is driven entirely by the frictional coupling that exists between it and the positively driven metering roller 100 during the relatively short periods of film advance. In preferred form of the invention that coupling is effective mainly during the initial portion of the film advancing period, since the frictional force exerted on the film is made to decrease sharply toward the end of that period, as already described. We have found that such frictional coupling between the rollers provides satisfactory drive for the backup roller, particularly if its moment of inertia is made abnormally large, as by mounting on it a flywheel structure as indicated at 140 in FIG. 7. The additional moment of inertia then insures substantial uniformity of roller speed despite the intermittent drive cycle and also despite the intermittent loading of the backup roller by the film during the film acceleration phase. The structure of FIG. 7 has the great advantage of mechanical simplicity, while insuring uniformity of distribution of wear on the frictional surface of roller 110.

FIG. 8 represents, somewhat schematically, a further embodiment of the present invention that permits single frames to be exposed intermittently at arbitrary intervals, with rapid and accurate film advancement coordinated with each exposure. The register plate 50a corresponds generally to 50 of the previous embodiment, but illustrates provision of a curved film guide surface 52a. The film edge guides are omitted for clarity of illustration. A camera lens is shown at 148 opposite the exposure area or film aperture 149. The film may be held close to curved face 52a by the freely rotatable rollers 142. Film advancing rollers 100 and 110 may be similar to those previously described, and are preferably coupled by gears such as 102 and 112, but with long enough teeth to permit appreciable relative radial movement of the two rollers without gear disengagement. Roller 110 is journaled on the lever 144, freely pivoted on the machine frame at 145 and normally retained in the idle position shown in FIG. 8 by the positive stop 147 and the yielding means indicated as the spring 146. In that position, the two rollers 100 and 110 are far enough apart to leave ample clearance for the film between presser element 120a and roller 110. Hence, the rollers can be continuously driven without advancing the film. The rollers are shiftable to operating position by energizing the solenoid 150 to swing lever 144 clockwise as seen in FIG. 8 against the force of spring 146 against the positive stop indicated at 152. In that operating position the rollers are spaced as in FIG. 3, for example, so that presser element 120a causes a cycle of film advancement during each revolution, as already described.

FIG. 8 also shows modified register means for stopping and anchoring the film at each rest position. The upper register pin 156 and the lower register pin 158 are fixedly mounted above and below the film aperture in positions to enter film perforations. Both pins typically have beveled end faces, the direction of bevel being opposite, as shown. The main working surface of the upper pin is its upper surface, while the lower surface of the lower pin is its working surface. The beveled end of lower pin 158 permits the film to move freely downward along guide surface 52a, while the bevel of the upper pin would similarly permit upward movement of the film. The latter movement is not ordinarily required, and the bevel of the upper pin may be omitted or reduced to a very small angle if desired. Upper pin 156 is set in such spatial relation to aperture 149 that engagement of the upper pin working surface with the upper edge of a film perforation properly alines a film frame with the aperture. The lower pin is set at such distance below the upper pin that, when a film is defined as just described by the upper pin, the lower pin can enter another perforation, but only with slight longitudinal stretching of the length of film between the two pins. With both pins so engaging spaced film perforations, the longitudinal film position is accurately and positively defined. We have found that with the described arrangement of register pins, and with a suitably adjusted film advancing mechanism of the present general type, the momentum of the moving film, as it is arrested by engagement with the upper pin, causes the film to stretch enough to permit entry of the lower pin into its corresponding perforation. Once the film has been arrested, it returns to its normal longitudinal dimension, causing it to grip the two pins firmly, providing reliable, accurate and positive registration. The film can be fully released for another cycle of advancement by pushing it off the upper pin, typically in the manner already described in connection with FIGS. 1 to 6, since the beveled end of the lower pin offers no appreciable resistance to downward film movement.

FIG. 8 further illustrates a linkage by which the push-off member that releases the film from the register pins is operated by a cam on the same shaft as film advancing roller 100. Moreover, that linkage is so constructed that the push-off member is disabled automatically when backup roller 110 is in idle position. That arrangement has the advantage that the push-off mechanism is rendered operative simultaneously with the film drive, typically by energization of solenoid 150. The push-off member in the present structure comprises the plunger 160 which is slidably mounted in a bore in plate 50a and is yieldably urged by the spring 162 away from the film. Plunger 160 can be shifted to the left to release the film by counterclockwise rotation of the bell crank 164, freely pivoted at 165. The bell crank is driven via the pushrod 166 by counterclockwise rotation of the cam-follower lever 168, which is freely pivoted on a movable pivot axis 169. The left end of lever 168 carries a cam follower formation 174 adapted to engage the cam indicated schematically at 176, which is driven with roller 100. The pivot axis 169 for lever 168 is formed by the junction of the two links 170 and 172. The other end of link 170 is pivoted on the fixed pivot axis 171. The other end of link 172 is pivoted at 173 on the lever 144, already described.

In idle condition of the drive system, as shown in FIG. 8, link 172 forms an acute angle with lever 144. In that position, cam follower 174 clears the cam 176 and the film release mechanism is therefore disabled. When lever 144 is swung by solenoid 150 to active position, link 172 becomes nearly parallel with it, shifting pivot axis 169 upward as seen in FIG. 8 in an arc about fixed pivot 171. That raises cam follower 174 into operating relation with cam 176, rendering the release mechanism operative to push the film free of register pin 156. A particular advantage of the linkage geometry just described is that in its operating position link 172 is essentially parallel to main lever 144 and the reaction thrust exerted by cam 176 on lever 144 therefore produces only a negligible moment about that lever pivot 145. Lever 144 is thus enabled to shift both the film releasing mehanism and the film advancing mechanism between idle and operating conditions without appreciable interaction between those two mechanisms such as might permit one to disturb the accurate operation of the other.

FIG. 9 represents an illustrative electrical circuit for controlling solenoid 150 of FIG. 8 and also controlling an electrically actuated shutter by which single exposures may be made intermittently in response to a command signal. The winding of solenoid 150 is represented in FIG. 9 at F, and the winding of the shutter solenoid is indicated at S*h*. The shutter may be of any suitable type and may be mounted in conjnction with lens 148, as indicated schematically at 186. Shutter 186 may replace the revolving shutter of the embodiment of FIGS. 1 to 6, or may supplement such a continuously driven shutter. Four cam-operated switches are indicated at C1 to C4, controlled by suitably shaped and phased cams all mounted typically on the shaft of film metering roller 100, as indicated by the line 189. Switch C2 is normally closed, and is opened by cam action, the other cam operated switches being normally open. The circuit of FIG. 9 includes two relays with windings indicated at A and B, respectively. Winding A controls the two normally open switches A1 and A2, while winding B controls the normally closed switch B1 and the two normally open switches B2 and B3. Power supply lines 187 and 188 are connected to a suitable power source 190. The motor for driving rollers 100 and 110 is indicated at M, and is turned on by switch S3 in advance of operation of the camera. The control signal for initiating a cycle of operation may be derived in any desired manner, typically represented by the manual switch S1, which closes only momentarily upon actuation and then remains open until released and actuated again.

In operation of the system of FIG. 9, closure of S1 actuates relay A, closing the holding circuit via A1 and normally closed B1. Relay A also closes A2, preparing a circuit for actuation of relay B in response to the next closure of cam switch C1. Thus relay B can be actuated only in defined phase relation to the rotation of roller 100. Actuation of relay B closes a holding circuit via B2 and normally closed C2, and also opens the holding circuit for relay A, releasing the latter. Relay B also closes B3, preparing actuating circuits for windings F and S*h*, which are actuated in suitable time relation by the respective cam switches C3 and C4. Those switches may be arranged to expose the film and then advance it one frame, or to advance the film first and then expose it, whichever is preferred for the particular intended application of the system. Following operation of the shutter and film advance mechanisms, switch C2 is opened by its cam, releasing relay B. The system is thereby returned to its normal idle condition, ready for another cycle of operation in response to a further command signal from S1.

The system of FIG. 9 also provides capability for continuous exposures during a short command period, while maintaining motor drive continuously from one such period to another. For that purpose, the conventional manual switch S2 is connected in parallel to A2. Closure of S2 thus prepares the actuating circuit for relay B, and holds that prepared circuit for as long as S2 is held depressed. Hence relay B is actuated by C1 during each cycle of revolution of cam 100, producing continuous operation of the camera. Switch S2 can be released at will, immediately terminated the series of exposures; and another series can be initiated at will without the time limitations that are imposed in normal motion picture camera operation by the requirement for starting and stopping the motor and drive mechanism.

FIG. 10 represents schematically a film movement in which the variation of the driving force applied to the film during each cycle of film movement is controlled electrically, rather than mechanically. In FIG. 10 the two rollers 200 and 210 both have continuous film contacting surfaces, and both are typically formed of materials with high coefficient of friction. Roller 200 is driven directly by means not explicitly shown, and roller 210 is driven from roller 200 by gears 202 and 212 with long teeth to permit relative radial movement of the rollers, as already described in connection with FIG. 8. Roller 210 is freely journaled on the lever 204, pivotally mounted on a fixed pivot at 206. Lever 204 is normally held against the fixed stop 208 by the spring 212, and is swung about pivot 206 by energization of the solenoid 250. That swinging movement, however, is not limited by a stop as in FIG. 8, but produces contact of the film with the two rollers regardless of their angular positions. The present system utilizes the fact that the force exerted by solenoid 250, which determines the frictional force exerted by the rollers on the film, varies with the solenoid current.

That current may be controlled by circuit means of any suitable type to produce current pulses of a desired shape. In the present example, the switch S4 in FIG. 10 is cam actuated for a predetermined time interval once during each revolution of the cam 218. That cam is typically mounted on the shutter shaft 220 of the camera or projector, since in the present device rollers 200 and 210 preferably rotate at speeds that are effectively incommensurate with each other and with the film cycle. Closure of switch S4 applies the positive direct current voltage from a suitable power source 222 to the line 224. That line is connected through solenoid 250 to the negative power line 226. Line 224 is also shunted to line 226 via the diode 228 and the capacitance 230. The junction between 228 and 230 is connected via the resistance 232 back to line 224.

In operation of that illustrative circuit, switch closure applies the full voltage from source 222 across solenoid 250, producing vigorous initial acceleration of the film. That phase of the operation is represented schematically by the rectangular block portion 241 of the waveform 240. During that phase, capacitance 230 is charged to the full supply voltage via diode 228. On opening of switch S4, the solenoid continues to receive current from the charge on capacitance 230, but only via the resistance 232, due to blocking action of diode 228. Resistance 232 reduces the current flow to a relatively low value, indicated at 242. Moreover, that current decays exponentially, with discharge of the capacitance, typically along the curve 244. Suitable film arresting mechanism such as the register pin and release lever described in connection with FIGS. 1 to 6, for example, can operate effectively at such a time as that indicated by the dashed line 245, when the frictional force on the film has decreased to a low value, typically just sufficient to overcome the resistance to its movement. The film is thus stopped positively in accurate registration. A wide variety of pulse waveforms, of which 240 is typical, can be developed, as desired, by application of known electrical principles.

It will be evident without detailed description that the system of FIG. 10, with its electrical control of the film driving force, can be adapted for taking single exposures, as by introducing a control system such as that of FIG. 9 with a suitable pulse shaping circuit connected in shunt to solenoid winding F.

We claim:

1. An intermittent movement for a film having longitudinally spaced film perforations, comprising in combination
    guide structure defining a film path including at least a path section at which the film is shiftable transversely of its plane,
    means actuable to accelerate the film longitudinally of the path
    fixedly mounted registration means projecting transversely into the film path at said path section and adapted to engage a film perforation of a film in the the path and thereby arrest the film movement at a definite longitudinal film position,
    retainer means movable laterally of the film at said path section for engaging the film and urging the same laterally toward the registration means to cause engagement thereof in a film perforation,
    release means movable to shift the film transversely of its plane at said path section out of engagement with the registration means,
    and means for intermittently actuating the film accelerating means and for causing movement of the release means in predetermined mutual time relation to cause intermittent longitudinal film movement.

2. An intermittent movement as defined in claim 1, and wherein the film accelerating means is actuable to engage the film with a frictional force that decreases progressively during the period of film movement.

3. An intermittent movement as defined in claim 1, and including also means for disabling said retainer means in response to actuation of the release means.

4. An intermittent movement as defined in claim 3, and wherein said release means comprise
    an element movable transversely of the film path in the direction of projection of the registration means in response to release means actuation,
    a first surface on the element engageable with the retainer means for disabling the same,
    and a second surface on the element engageable with the film for moving it laterally out of engagement with the registration means.

5. An intermittent movement as defined in claim 1, and wherein
    said registration means comprise a pin having a cross section that substantially fits the film perforation dimension in the direction longitudinal of the film,
    and said retainer means comprise a member movable transversely of the film plane and carrying surfaces adapted to engage the front film face closely adjacent and on opposite sides of a film perforation that is alined with the pin, and spring means normally urging the member toward the film with sufficient force to slip the film perforation over the pin.

6. An intermittent movement as defined in claim 1, and wherein
    said registration means comprise a pin projecting from a substantially flat film supporting surface,
    and said retainer means comprise a member movable transversely of the film plane and carrying a surface adapted to engage the front film face closely adjacent a film perforation that is alined with the pin, and spring means for urging the member toward the film supporting surface with sufficient force to slip the perforation over the pin and to clamp the film against the film supporting surface.

7. An intermittent movement for a film having longitudinally spaced film perforations, comprising in combination
    guide structure defining a film path for longitudinal film movement,
    a continuously driven rotary member journaled on an axis on one side of the path and having a substantially cylindrical surface adapted to engage a face of a film in the path to exert thereon a longitudinal frictional force to produce said film movement,
    means actuable to press the film against said surface with a varying force during a film drive period, said force having an initial value sufficient to frictionally accelerate the film essentially to the full peripheral speed of said surface during an initial portion of said drive period, and said force decreasing during the remaining portion of the drive period to a second value approximately sufficient to maintain film movement,
    and means for releasably engaging a film perforation close to the end of said drive period to stop the film positively at a predetermined longitudinal position.

8. An intermittent film movement as defined in claim 7, and wherein said pressing means comprise
    a rotary presser member journaled on an axis generally parallel to the axis of the first said rotary member and on the opposite side of the film path therefrom, and having a generally cylindrical surface adapted to engage the face of the film opposite to the film face engaged by the first said rotary member, and means actuatable to vary the distance between said axes during the film drive period to press the film between the respective surfaces of the rotary members with variable force.

9. An intermittent film movement as defined in claim 7, and wherein said pressing means comprise a support movable transversely of the film path toward and away from said rotary member, a rotary presser member journaled on the support on an axis generally parallel to the axis of the first said rotary member and on the opposite side of the film path therefrom, and having a generally cylindrical surface adapted to engage the face of the film opposite to the film face engaged by the first said rotary member in response to support movement toward the first said rotary member, electromagnetic means variably energizable to yieldingly urge the support toward the first said rotary member with a force that varies with said energization, and circuit means for variably energizing the electromagnetic means during the film drive period to press the film between the respective surfaces of the rotary members with variable force.

10. An intermittent film movement as defined in claim 7, and wherein said pressing means comprise a continuously driven rotary support journaled on an axis on the other side of the film path and parallel to the axis of said rotary member, a presser element having a generally cylindrical contact surface of limited peripheral extent, and structure mounting the presser element movably on the support with the contact surface normally approximately coaxial thereof, with the leading portion of the contact surface essentially fixed at a predetermined radius and with the trailing portion of the contact surface yieldingly movable inwardly from that radius.

11. An intermittent film movement as defined in claim 10, and wherein said mounting structure includes means pivotally mounting the presser element on the support on a pivot axis essentially parallel to the support axis and adjacent the leading portion of the contact surface, resilient means tending to swing the presser element outwardly about the pivot axis, and means limiting said outward movement at a position with the contact surface approximately coaxial with respect to the support axis.

12. An intermittent film movement as defined in claim 11, and including also means for adjustably tensioning said resilient means to vary the outward torque exerted thereby on said presser element.

13. An intermittent film movement as defined in claim 7, and wherein said pressing means comprise a continuously driven rotary support journaled on an axis on the other side of the film path and generally parallel to the axis of the first said rotary member, and a generally cylindrical presser surface of limited peripheral extent carried by said support with a leading portion at a predetermined radius to engage the film between said surfaces with a frictional force having said initial value, and with a trailing portion of the presser surface at a lesser radius to engage the film between said surfaces with a frictional force having said second value.

14. An intermittent movement as defined in claim 7, and wherein said guide structure comprises two edge guide blocks fixed with respect to the film path and mutually spaced longitudinally thereof along one edge of the film, and edge guide means for the other edge of the film fixed with respect to the film path and laterally spaced from said edge guide blocks by more than the width of said film, and wherein said film perforation engaging means comprise a register pin projecting into the film path transversely of the film plane at a position longitudinally between the edge guide blocks and adapted to enter a film perforation that is adjacent said one edge of the film, said pin having a side surface adapted to engage the side edge of said perforation toward said one film edge and positioned to maintain that film edge in contact with both said edge guide blocks during such engagement, the film being free of longitudinal frictional restraint by said guide structure when not so engaged by the pin.

15. An intermittent movement as defined in claim 7, and wherein said film perforation engaging means comprise two register pins projecting into the film path transversely of the film plane at positions spaced longitudinally of the film path and adapted to enter respective film perforations that are spaced longitudinally of the film, the pins having respective working side faces, each on the pin side that faces away from the other pin, that are substantially perpendicular to the film plane and are adapted to engage corresponding edges of the respective film perforations, the pin spacing being so related to the film perforation spacing that a film so engaged is held taut longitudinally between the two pins, the pin that is downstream with respect to the direction of film movement having an end face that is inclined in a direction to prevent the pin from so engaging a film perforation as to prevent forward film movement, and release means actuable to positively shift the film free of the upstream pin to permit forward longitudinal film movement.

16. An intermittent movement for a film having longitudinally spaced film perforations, comprising in combination guide structure defining a film path for longitudinal film movement and including two edge guide blocks fixed with respect to the film path and mutually spaced longitudinally thereof along one edge of the film, and edge guide means for the other edge of the film fixed with respect to the film path and laterally spaced from said edge guide blocks by more than the width of said film, means actuable intermittently to frictionally engage the film and accelerate it longitudinally of the path, means for releasably engaging a film perforation to stop the film positively at defined longitudinal positions along the path, and comprising a register pin projecting into the film path transversely of the film plane at a position longitudinally between the edge guide blocks and adapted to enter a film perforation that is adjacent said one edge of the film, said pin having a side surface adapted to engage the side edge of said perforation toward said one film edge and positioned to maintain that film edge in contact with both said edge guide blocks during such engagement, the film being free of longitudinal frictional restraint by said guide structure when not so engaged by the pin, and means for releasing the film perforation from said pin timed relation to the actuation of the film accelerating means.

17. An intermittent movement for a film having longitudinally spaced film perforations, comprising in combination guide structure defining a film path for longitudinal film movement, means actuable intermittently to frictionally engage the film and accelerate it forwardly along the path, two register pins projecting into the film path transversely of the film plane at positions spaced longitudinally of the film path and adapted to enter respective film perforations that are spaced longitudinally of the film, the pins having respective working side faces, each on the pin side that faces away from the other pin, that are substantially perpendicular to the film plane and are adapted to engage corresponding edges of the respective film perforations, the pin spacing being so related to the film perforation spacing that a film so engaged is held taut longitudinally between the two pins, the pin that is downstream with respect to the direction of forward film movement having an end face that is inclined in a direction to prevent the pin from so engaging a film perforation as to prevent forward film movement, and release means actuable in timed relation to the film accelerating means to positively shift the film free of the upstream pin to permit forward longitudinal film movement.

18. An intermittent movement for a film having longitudinally spaced film perforations, comprising in combination guide structure defining a film path for longitudinal film movement, two rotary members journaled on respective parallel axes on opposite sides of the path and having substantially cylindrical surfaces adapted to engage opposite faces of the film to exert thereon a longitudinal frictional force to produce said film movement, at least one of said surfaces having a limited peripheral extent to limit the film travel during which said force is exerted, means for continuously driving at least said one rotary member, means for releasably engaging a film perforation to stop the film positively near the end of said limited travel, and means for laterally shifting the axis of at least one of the rotary members between an active position in which the surfaces frictionally engage the film and an idle position in which the surfaces are spaced apart by a distance greater than the film thickness.

19. An intermittent movement as defined in claim 18, and wherein said perforation engaging means comprise fixedly mounted registration means projecting transversely into the film path and adapted to enter a film perforation, release means actuable to positively shift the film laterially away from said registration means to permit longitudinal film movement, and means for actuating the release means intermittently in timed relation to the rotation of the surface of limited angular extent.

20. An intermittent movement as defined in claim 19, and including also means acting to disable said film releasing means in response to said idle position of the axis shifting means.

21. An intermittent movement as defined in claim 18, and including also control means for the axis shifting means acting to prevent movement thereof to said active position except during a limited angular range of the rotational movement of said surface of limited extent, said limited angular range excluding the angular range of film engagement.

22. An intermittent movement for a film having longitudinally spaced film perforations, comprising in combination guide structure defining a film path for longitudinal film movement, two rotary members journaled on respective parallel axes on opposite sides of the path and having respective substantially cylindrical surfaces adapted to engage opposite faces of the film to exert thereon a longitudinal frictional force to produce film movement, the surface of one of said rotary members having a limited peripheral extent to limit the film travel during which said force is exerted, power means for continuously driving said one rotary member, the other rotary member being freely rotatable on its journal and being driven in its rotation only by frictional engagement of the film, means mounted on said other rotary member for increasing the moment of inertia thereof with respect to its axis of rotation, and means for engaging a film perforation to stop the film positively near the end of said limited travel.

23. In an intermittent movement for a film having longitudinally spaced film perforations, said movement including guide structure defining a film path including at least a path section at which the film is shiftable transversely of its plane, and means for exerting a yielding force on the film to move it longitudinally of the path; mechanism for controlling the film movement, comprising in combination fixedly mounted registration means projecting transversely from one side of the film path at said path section and adapted to engage a perforation of a film in the path and thereby arrest the film movement at a definite longitudinal film position, retainer means movable laterally of the film and including a working surface in position to engage the film face opposite to the registration means and thereby shift the film laterally into engagement with the registration means, release means movable laterally of the film and including a working surface in position to enage the film face on said one side and thereby shift the film laterally out of engagement with the registration means, and mechanism for intermittently and alternately shifting the working surface of the release means into film engagement to release the film from the registration means at the start of a period of film movement and shifting the working surface of the retaining means into film engagement to engage the film with the registration means to terminate a period of film movement.

24. The combination defined in claim 23, and including coupling structure acting between the release means and the retaining means for positively maintaining between their respective working surfaces a mutual spacing that exceeds the thickness of the film.

25. Mechanism for intermittently accelerating a film along a film path, comprising in combination a rotary member journaled on an axis on one side of the path and having a coaxial cylindrical contact surface, a second rotary member journaled on an axis parallel to the axis of the first said rotary member and on the opposite side of the film path therefrom, means for continuously driving at least the second rotary member, a presser element having a generally cylindrical contact surface of limited peripheral extent, structure mounting the presser element on the second rotary member for movement relative thereto in a generally radial direction within a limited range that includes a position in which the contact surface of the presser element is approximately coaxial at a radius such that a film in the path is frictionally gripped intermittently between the contact surfaces of the two rotary members, and means for controlling the radial force exerted by the presser element contact surface against the film to vary the longitudinal frictional force exerted on the film.

26. Mechanism as defined in claim 25 and in which said driving means directly drives the second rotary member, and the first said rotary member is driven only by frictional engagement of its contact surface with the film.

References Cited

UNITED STATES PATENTS

| | | | |
|---|---|---|---|
| 1,509,092 | 9/1924 | Anselmi | 226—55 |
| 3,225,991 | 12/1965 | Palmer | 226—56 |

M. HENSON WOOD, Jr., *Primary Examiner.*

R. A. SCHACHER, *Assistant Examiner.*

U.S. Cl. X.R.

226—155